(12) United States Patent
Liu

(10) Patent No.: US 11,912,182 B2
(45) Date of Patent: Feb. 27, 2024

(54) FIXING DEVICE FOR AN ARMREST OF AN AUTOMOBILE SEAT AND AUTOMOBILE SEATS

(71) Applicant: WONDERLAND SWITZERLAND AG, Steinhausen (CH)

(72) Inventor: Weihuan Liu, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 10 days.

(21) Appl. No.: 17/676,124

(22) Filed: Feb. 19, 2022

(65) Prior Publication Data

US 2022/0266732 A1    Aug. 25, 2022

(30) Foreign Application Priority Data

Feb. 19, 2021   (CN) .......................... 202110191561.4

(51) Int. Cl.
*B60N 2/75*   (2018.01)
*A47C 7/54*   (2006.01)
(Continued)

(52) U.S. Cl.
CPC .................. *B60N 2/75* (2018.02); *A47C 1/03* (2013.01); *A47C 7/54* (2013.01); *A47C 7/541* (2018.08);
(Continued)

(58) Field of Classification Search
CPC ........ B60N 2/2872; B60N 2/75; B60N 2/787; A47C 7/54; A47C 1/03; A47C 7/541; A47C 7/546
See application file for complete search history.

(56) References Cited

U.S. PATENT DOCUMENTS 8,960,793 B2 *  2/2015  Gillett .................. B60N 2/2872
                                                     297/411.3
10,245,981 B2    4/2019  Mitchell
(Continued)

FOREIGN PATENT DOCUMENTS

CN          201736845 A       2/2011
CN          202448782 U       9/2012
(Continued)

OTHER PUBLICATIONS

Search Report issued in corresponding Chinese Patent Publ. 202110191561.4 dated Sep. 10, 2021, consisting of 14 pp.
(Continued)

*Primary Examiner* — Syed A Islam
(74) *Attorney, Agent, or Firm* — Volpe Koenig

(57) ABSTRACT

The present disclosure discloses a fixing device for an armrest of a car seat and a car seat, the fixing device comprises a fixing protrusion connected to the lower part of the armrest and a fixing recess arranged on each side of a cushion of the car seat, the fixing recess is close to a seat back of the car seat, and the fixing protrusion can be inserted into the fixing recess; one of the fixing protrusion and the fixing recess is provided with a locking projection, and the other is provided with a locking notch, the locking projection can be engaged to the locking notch, so that the fixing protrusion can be fixed into the fixing recess. The fixing device according to the present disclosure provides sufficient connection strength between the armrest and the car seat, and the assembly is convenient.

17 Claims, 13 Drawing Sheets

(51) Int. Cl.
    *A47C 1/03*     (2006.01)
    *B60N 2/28*     (2006.01)
(52) U.S. Cl.
    CPC ............ *A47C 7/546* (2013.01); *B60N 2/2872* (2013.01); *B60N 2/787* (2018.02)

(56) References Cited

U.S. PATENT DOCUMENTS

| | | | | |
|---|---|---|---|---|
| 2003/0080602 | A1* | 5/2003 | Wu | ............... A47C 7/54 297/411.46 |
| 2006/0202541 | A1 | 9/2006 | Armo et al. | |

FOREIGN PATENT DOCUMENTS

| | | |
|---|---|---|
| CN | 202764752 U | 3/2013 |
| CN | 104108329 A | 10/2014 |
| CN | 204020641 U | 12/2014 |
| CN | 204442623 U | 7/2015 |
| CN | 204641460 U | 9/2015 |
| CN | 105459864 A | 4/2016 |
| CN | 106573557 A | 4/2017 |
| CN | 107187356 A | 9/2017 |
| CN | 206615112 U | 11/2017 |
| CN | 108528302 A | 9/2018 |
| CN | 208248022 U | 12/2018 |
| CN | 211943757 U | 11/2020 |
| DE | 4315132 A1 | 11/1993 |
| DE | 19506855 C2 | 7/1998 |
| EP | 3202615 A1 | 8/2017 |
| EP | 2474441 B1 | 11/2017 |
| JP | 2002336080 A | 11/2002 |
| KR | 200440525 | 6/2008 |
| KR | 200460911 Y1 | 4/2012 |
| TW | M281831 U | 12/2005 |
| WO | 2012176738 A1 | 12/2012 |
| WO | 2016167288 A1 | 10/2016 |

OTHER PUBLICATIONS

Search Report issued in corresponding Chinese Patent Publ. 202011193585.5 dated Nov. 29, 2000, consisting of 3 pp.
Office Action in counterpart Taiwan Application No. 111105848 dated Nov. 10, 2022.
Office Action issued in counterpart German Patent Application No. 10 2022 103 946.3 dated May 26, 2023.

\* cited by examiner

FIXING DEVICE FOR AN ARMREST OF AN AUTOMOBILE SEAT AND AUTOMOBILE SEATS

CROSS-REFERENCE TO RELATED APPLICATIONS

This application claims priority to Chinese Application No. 202110191561.4, filed on Feb. 19, 2021, which is incorporated herein by reference in its entirety.

TECHNICAL FIELD

The present disclosure relates to a car seat, in particular to a fixing device for an armrest of a car seat.

BACKGROUND

In an automobile, the armrest of a car seat is an important part to ensure the safety and comfort of passengers.

SUMMARY

A fixing device for an armrest of a car seat is provided. The fixing device includes a fixing protrusion connected to the lower part of the armrest and a fixing recess arranged on each side of a cushion of the car seat, the fixing recess is close to the seat back of the car seat, the fixing protrusion can be inserted into the fixing recess; one of the fixing protrusion and the fixing recess is provided with a first locking projection, and the other is provided with a first locking notch, the first locking projection can be engaged to the first locking notch, so that the fixing protrusion can be fixed into the fixing recess.

In an embodiment, the outer side surface of the fixing protrusion is provided with the first locking projection with an inverted cone shape, and the position of the side wall of the fixing recess corresponding to the first locking projection is provided with the first locking notch.

In an embodiment, the outer side surface of the fixing protrusion is further provided with the first locking notch, and the position of the side wall of the fixing recess corresponding to the first locking notch on the outer side surface is provided with the first locking projection with a positive cone shape.

In an embodiment, the side wall of the fixing protrusion is provided with the first locking notch, and the position of the inner side surface of the fixing recess corresponding to the first locking notch is provided with the first locking projection with a positive cone shape.

In an embodiment, the fixing protrusion is a hollow tubular structure, the inner side surface of the tubular structure is provided with a first locking projection with an inverted cone shape, and the interior of the fixing recess is provided with a cylindrical structure capable of inserting into the tubular structure, the position of the side wall of the cylindrical structure corresponding to the first locking projection on the inner side surface of the tubular structure is provided with the first locking notch.

In an embodiment, the fixing protrusion is a hollow tubular structure, the inner side wall of the tubular structure is provided with the first locking notch, and the interior of the fixing recess is provided with a cylindrical structure capable of inserting into the tubular structure, the position of the outer side surface of the cylindrical structure corresponding to the first locking notch on the inner side wall of the tubular structure is provided with the first locking projection with a positive cone shape.

In an embodiment, the connection between the lower part of the armrest and the fixing protrusion has a step portion.

In an embodiment, the armrest includes an armrest body and an armrest upper cover covering the armrest body.

In an embodiment, the armrest body is provided with a second locking projection with a positive cone shape, the position of the armrest upper cover corresponding to the second locking projection is provided with a second locking notch, and the second locking projection can be engaged to the second locking notch, so that the armrest upper cover can be fixed to the armrest body.

In an embodiment, the armrest body is provided with a second locking notch, the position of the armrest upper cover corresponding to the second locking notch is provided with a second locking projection with an inverted cone shape, and the second locking projection can be engaged to the second locking notch, so that the armrest upper cover can be fixed to the armrest body.

In another embodiment, the present disclosure provides a car seat, and the armrest of the car seat uses the aforementioned fixing device for the armrest of the car seat.

In an embodiment, the car seat is further provided with a shelf, the shelf is provided with a third locking projection with a positive cone shape, the cushion of the car seat is provided with a third locking notch, and the third locking projection can be engaged to the third locking notch, so that the shelf can be fixed to the cushion of the car seat.

The foregoing and other objects, features, aspects and advantages of the present disclosure will become more apparent from the following detailed description of the present disclosure combined with the accompanying drawings.

BRIEF DESCRIPTION OF THE DRAWINGS

The accompanying drawings are included herein to provide a further understanding of the present disclosure and are incorporated into this specification to form a part of this specification. The accompanying drawings show embodiments of the present disclosure and are used to illustrate the concept of the present disclosure together with the following description.

In the accompanying drawings.

Figure 1:
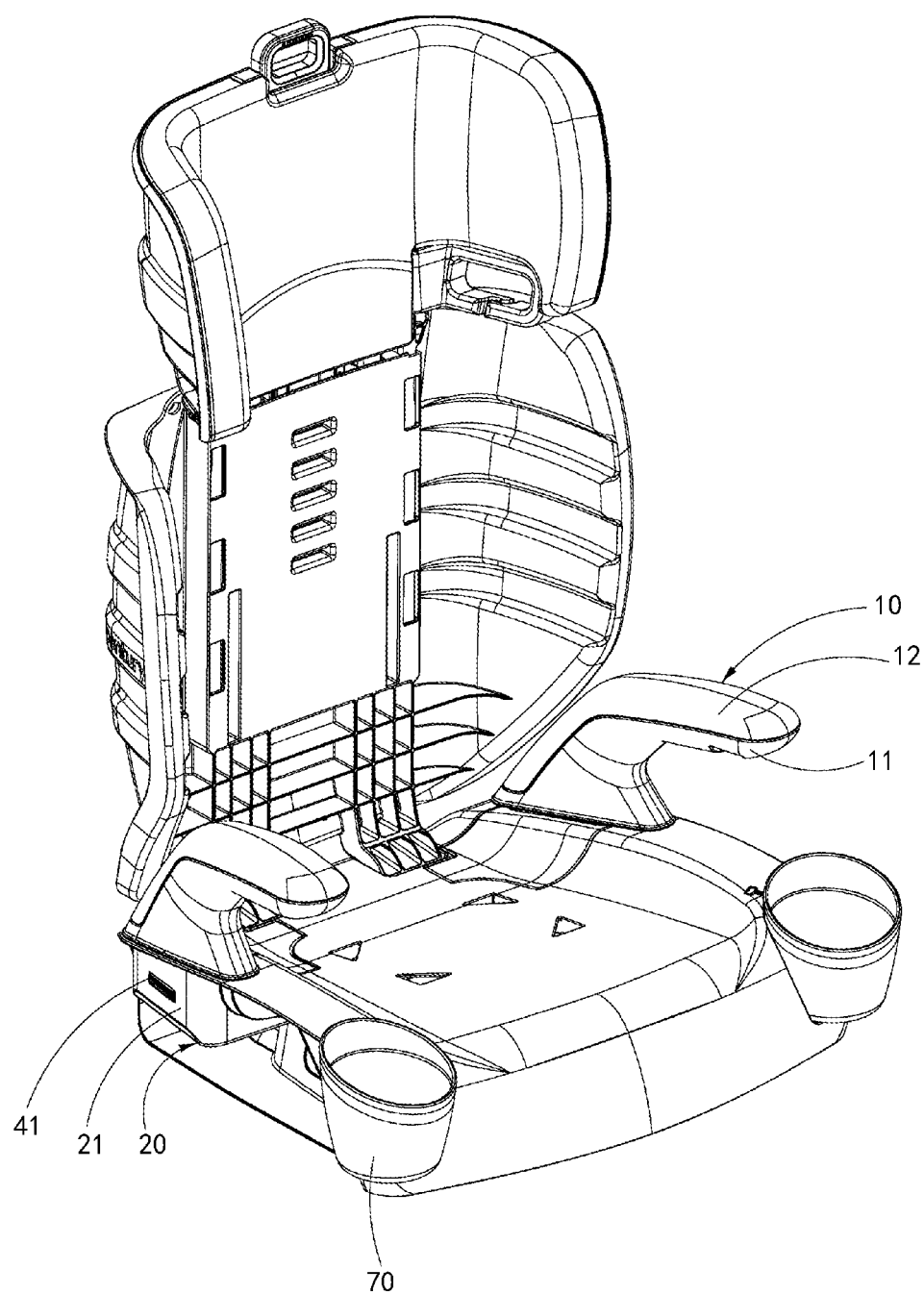
FIG. 1 is a schematic diagram of the car seat equipped with the fixing device of the armrest according to the present disclosure.

The list of reference numerals is as follows:
- 10 armrest
  - 11 armrest body
  - 12 armrest upper cover
- 20 fixing protrusion
  - 21 outer side surface of the fixing protrusion
  - 22 tubular structure
    - 221 inner side surface of tubular structure
- 30 fixing recess
  - 31 side wall of the fixing recess
  - 32 cylindrical structure
    - 321 side wall of cylindrical structure
- 41 first locking projection
- 42 second locking projection
- 43 third locking projection
- 51 first locking notch
- 52 second locking notch
- 53 third locking notch
- 60 step portion
- 70 shelf

DETAILED DESCRIPTION

The present disclosure will be described in detail below with reference to the accompanying drawings.

Figure 2:
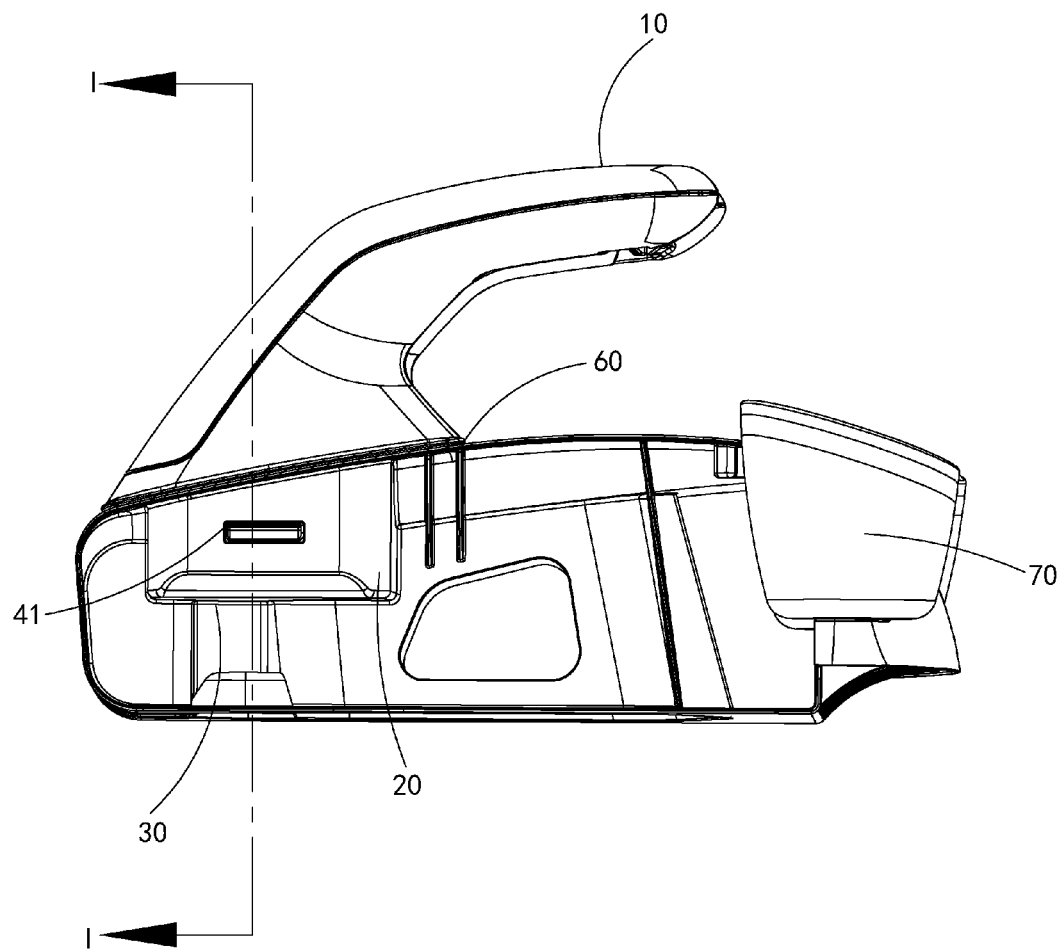
FIG. 2 is a lateral schematic diagram of the car seat in FIG. 1.
Figure 3:
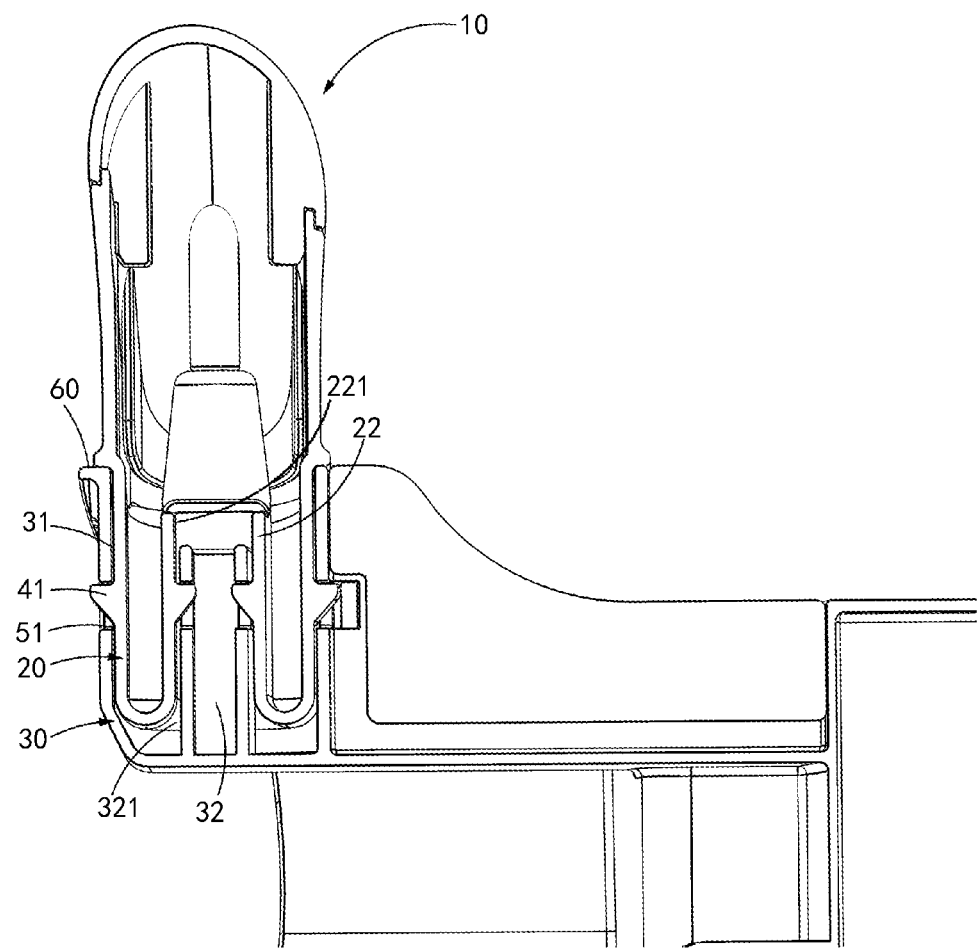
FIG. 3 is a partial sectional view taken along line 'I-I' of FIG. 2.

As shown in FIGS. 1 to 3, the fixing device for the armrest 10 of the car seat according to the present disclosure includes a fixing protrusion 20 connected to the lower part of the armrest 10 and a fixing recess 30 arranged on each side of the cushion of the car seat. The fixing recess 30 is close to the seat back of the car seat and arranged at the bottom of the car seat, and the fixing protrusion 20 can be inserted into the fixing recess 30.

In order to facilitate processing, the armrest 10 and the fixing protrusion 20 can be formed as a whole, or they can be formed respectively, and then assembled together by welding, adhesive or threaded connection, etc.

In order to ensure that the armrest 10 is sufficient to support the leaning of the passengers, the fixing protrusion 20 and the fixing recess 30 can be made of metal or non-metallic materials and need to have a certain strength.

Meanwhile, in order to firmly fix the fixing protrusion 20 into the fixing recess 30, one of the fixing protrusion 20 and the fixing recess 30 is provided with a first locking projection 41, the other is provided with a first locking notch 51, and the first locking projection 41 can be engaged to the first locking notch 51. In this way, the fixing protrusion 20 will not be accidentally separated after being inserted into the fixing recess 30.

In the first embodiment according to the present disclosure, the first locking projection 41 and the first locking notch 51 are arranged on the outer side of the fixing protrusion 20 and the inner side of the fixing recess 30, respectively.

For simplicity, the following takes the case where the first locking projection 41 is arranged on the fixing protrusion 20 and the first locking notch 51 is arranged on the fixing recess 30 as an example to describe. However, it should be understood that the case where the first locking projection 41 is arranged on the fixing recess 30 and the first locking notch 51 is arranged on the fixing protrusion 20 is also included in the scope of the present disclosure.

In the embodiment shown in FIGS. 1 to 5, the outer side surface 21 of the fixing protrusion 20 is provided with the first locking projection 41, the side wall 31 of the fixing recess 30 is provided with the first locking notch 51, and the position of the first locking projection 41 corresponds to the position of the first locking notch 51. Moreover, in this embodiment, the first locking projection 41 adopts an inverted cone gradually reducing from top to bottom (as seen in FIG. 3). The first locking projection 41 with an inverted cone shape can bring about the following effects: on the one hand, when the fixing protrusion 20 is inserted into the fixing recess 30, the first locking projection 41 will not hinder the insertion action; on the other hand, when the fixing protrusion 20 is completely inserted into the fixing recess 30 and the first locking projection 41 is engaged to the first locking notch 51, the first locking projection 41 with an inverted cone shape is stuck by the first locking notch 51, which can well prevent the fixing protrusion 20 from withdrawing from the fixing recess 30, so as to further ensure that the fixing protrusion 20 is firmly fixed into the fixing recess 30. Alternatively, the first locking projection 41 in the present disclosure can also take other shapes, as long as the first locking projection of this shape can bring about the above two effects.

In another aspect of the first embodiment, the first locking projection can be arranged on the inner side surface of the fixing recess 30, and the first locking notch can be arranged on the side wall of the fixing protrusion 20. In another aspect, the first locking projection adopts a positive cone (not shown) gradually expanding from top to bottom, so as to bring about the above two effects.

Figure 8:
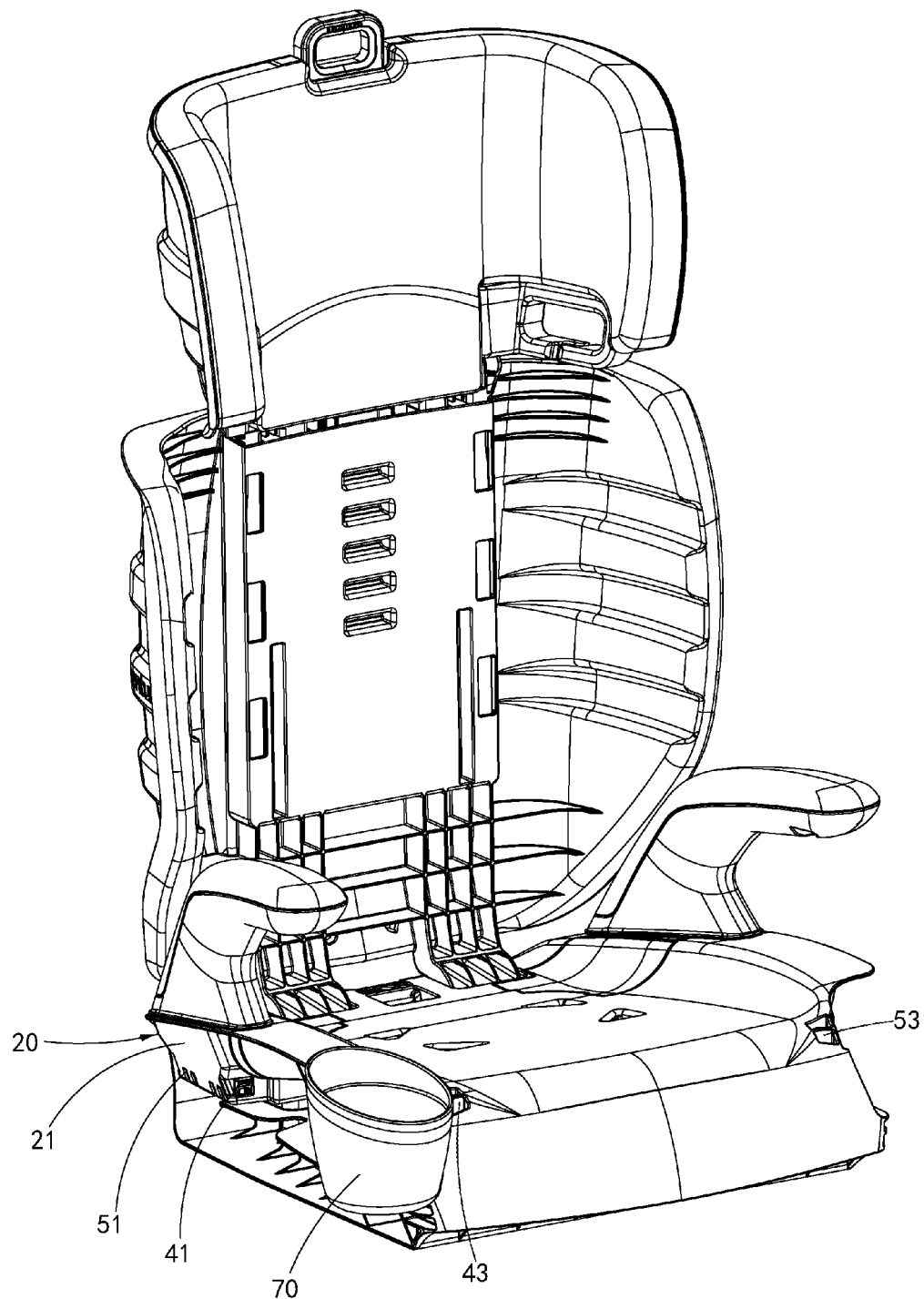
FIG. 8 is a schematic diagram of the car seat equipped with the fixing device of the armrest according to another embodiment of the present disclosure.
Figure 10:
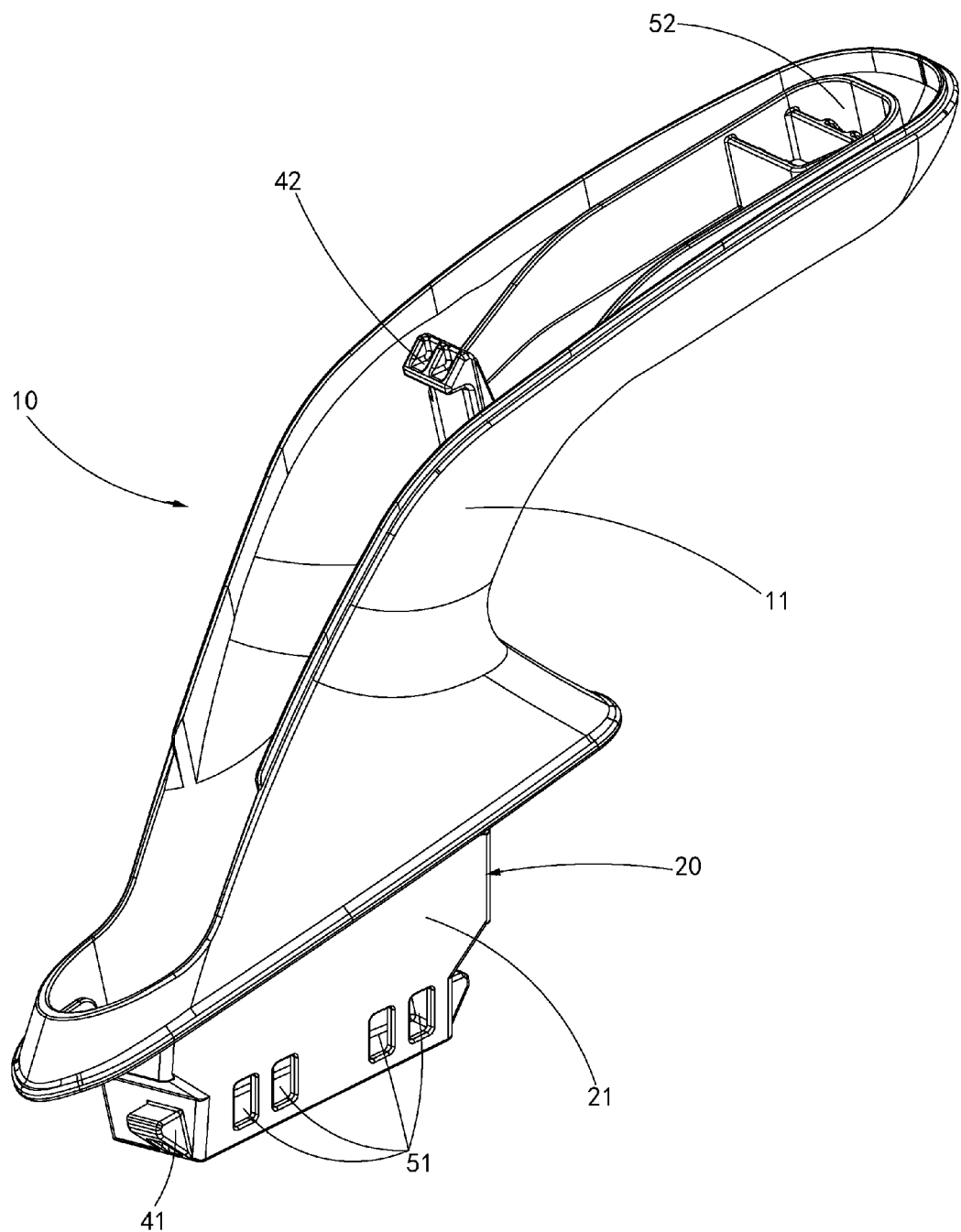
FIG. 10 is a schematic diagram of the fixing device and armrest in FIG. 9 seen from another angle.

In another aspect of the first embodiment, as shown in FIG. 8 and FIG. 10, the outer side surface 21 of the fixing protrusion 20 is provided with a first locking notch 51 in addition to the first locking projection 41. At the same time, the position of the side wall 31 of the fixing recess 30 corresponding to the first locking notch 51 on the outer side surface 21 is provided with a first locking projection 41 with a positive cone shape.

In the second embodiment according to the present disclosure, the fixing protrusion 20 may be a hollow tubular structure 22, and the interior of the fixing recess 30 may have a cylindrical structure 32 capable of inserting the tubular structure 22. The cooperation between the tubular structure 22 and the cylindrical structure 32 will be more conducive to the mutual fixation of the fixing protrusion 20 and the fixing recess 30.

In the second embodiment, the first locking projection 41 and the first locking notch 51 are arranged on the tubular structure 22 of the fixing protrusion 20 and the cylindrical structure 32 of the fixing recess 30, respectively.

For simplicity, the following takes the case where the first locking projection 41 is arranged on the tubular structure 22 of the fixing protrusion 20 and the first locking notch 51 is arranged on the cylindrical structure 32 of the fixing recess 30 as an example to describe. However, it should be understood that the case where the first locking projection 41 is arranged on the cylindrical structure 32 of the fixing recess 30 and the first locking notch 51 is arranged on the tubular structure 22 of the fixing the protrusion 20 is also included in the scope of the present disclosure.

Specifically, in one aspect of the second embodiment, as shown in FIG. 3, the inner side surface 221 of the tubular structure 22 is provided with the first locking projection 41, the side wall 321 of the cylindrical structure 32 is provided with the first locking notch 51, and the position of the first locking projection 41 corresponds to the position of the first locking notch 51. Moreover, in this aspect, the first locking projection 41 adopts an inverted cone in order to bring about the above two effects.

In another aspect of the second embodiment, the first locking projection can be arranged on the outer side surface of the cylindrical structure 32, and the first locking notch can be arranged on the inner wall of the tubular structure 22. In another aspect, the first locking projection adopts a positive cone (not shown) in order to bring about the above two effects.

Figure 6:
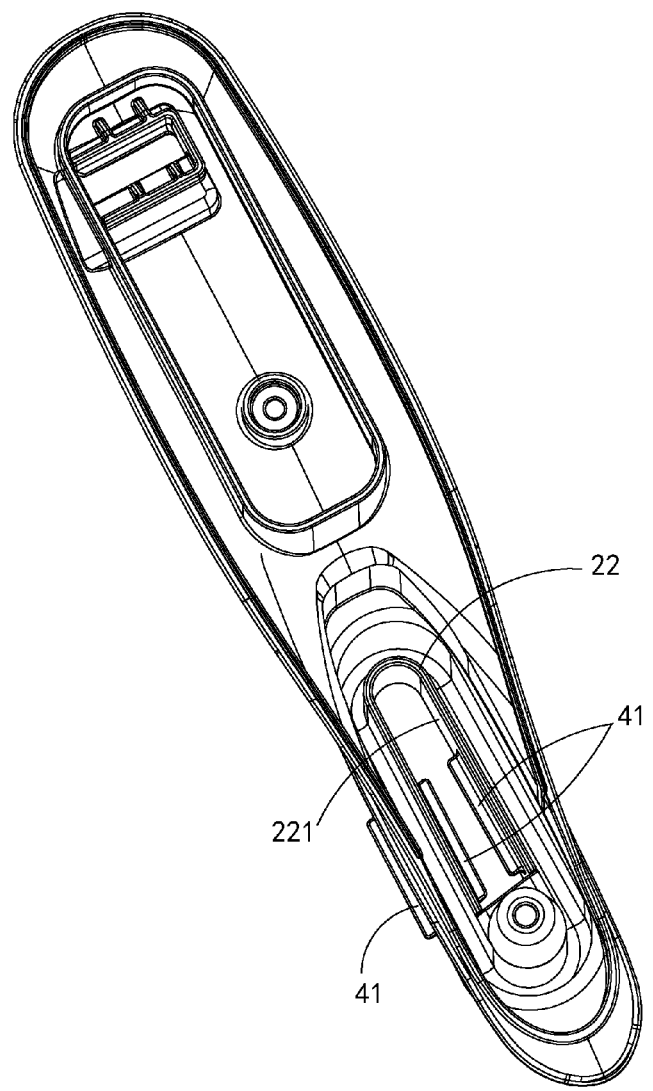
FIG. 6 is a schematic diagram of the fixing device and armrest in FIG. 4 seen from another angle.
Figure 7:
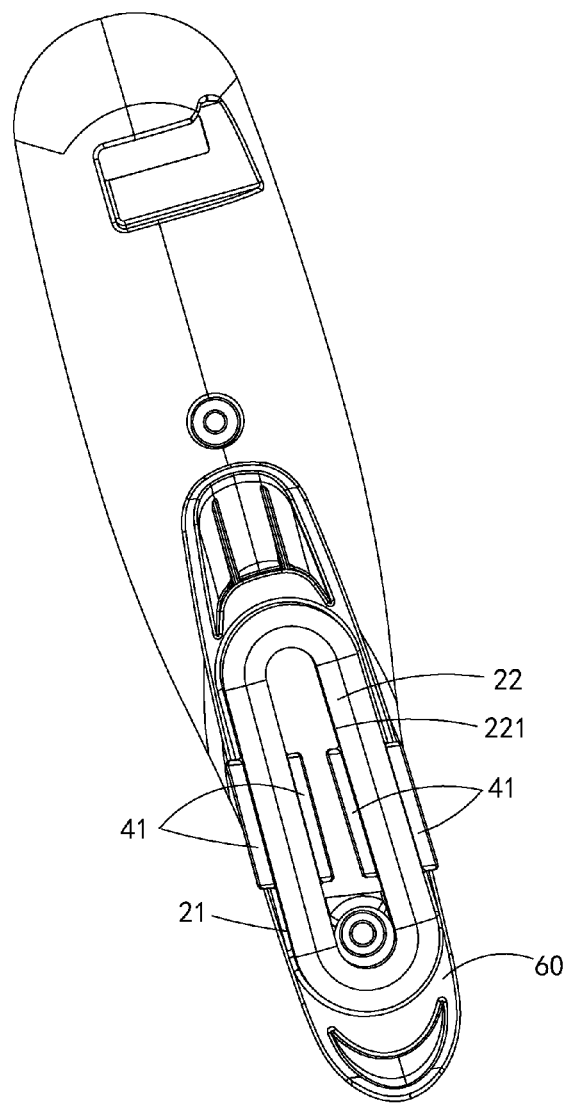
FIG. 7 is a schematic diagram of the fixing device and armrest in FIG. 4 seen from another angle.

The present disclosure can adopt the first embodiment or the second embodiment respectively, which can meet the requirement of firmly fixing the fixing protrusion 20 into the fixing recess 30. Of course, the present disclosure can also adopt these two embodiments at the same time, as shown in FIG. 3 and FIGS. 6-7, so that the fixing protrusion 20 is more firmly fixed into the fixing recess 30.

Figure 4:
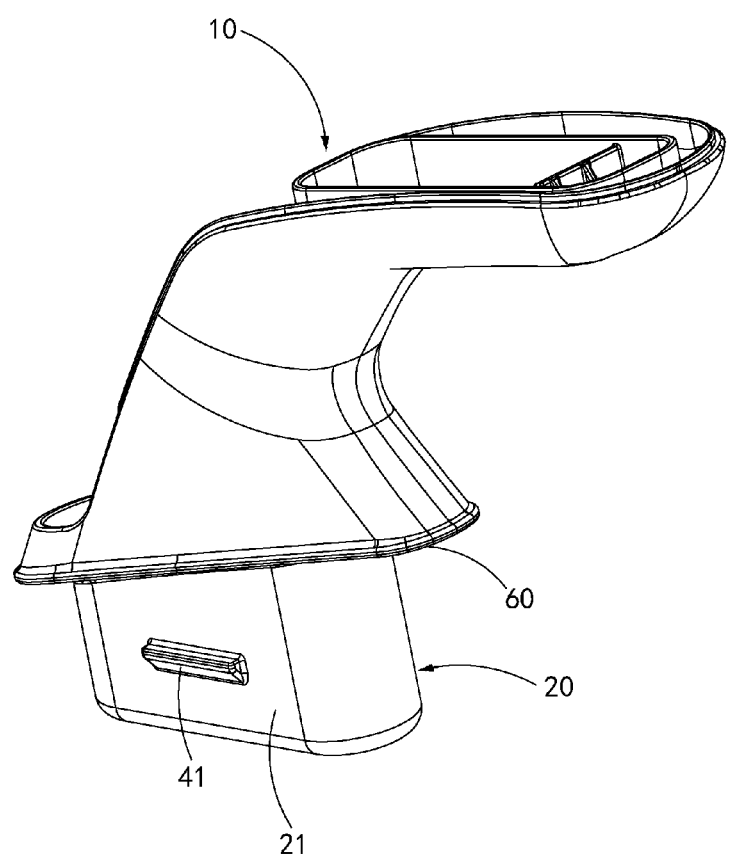
FIG. 4 is a schematic diagram of the fixing device and the armrest without armrest upper cover according to an embodiment of the present disclosure.
Figure 5:
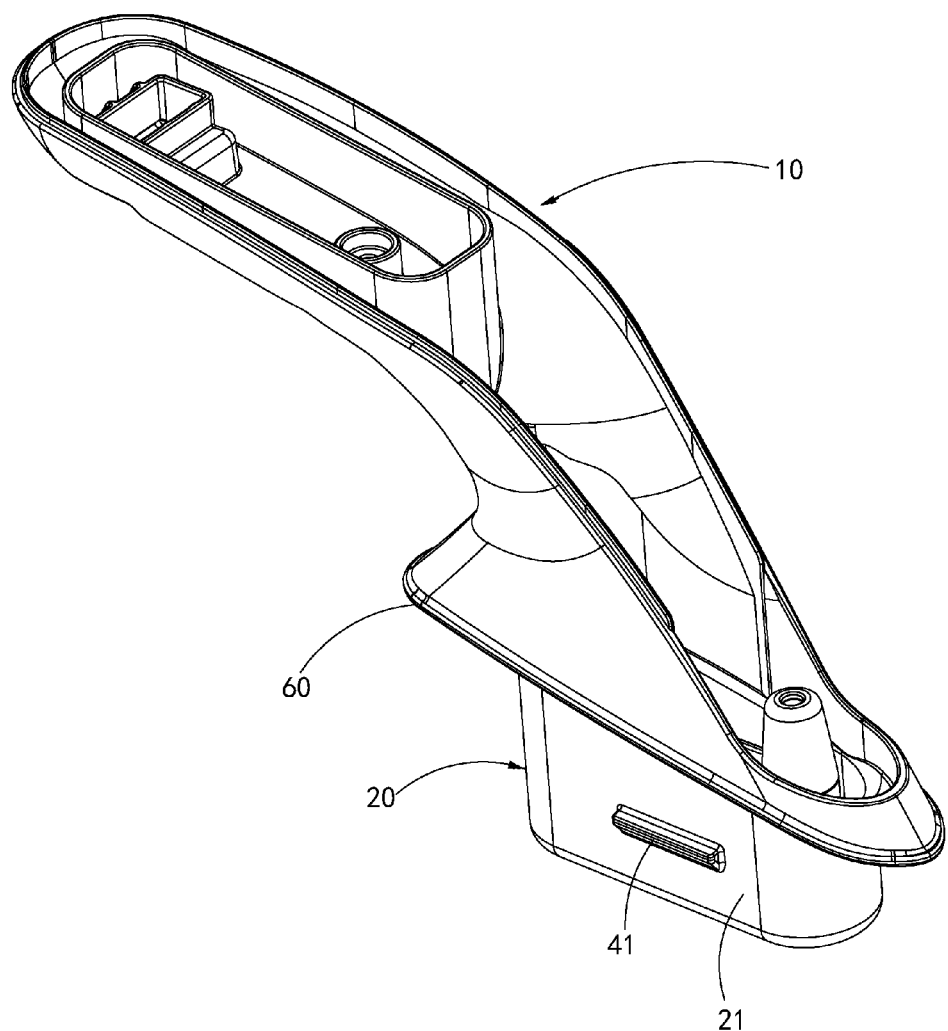
FIG. 5 is a schematic diagram of the fixing device and armrest in FIG. 4 seen from another angle.

After the fixing protrusion 20 is completely inserted into the fixing recess 30 and the first locking projection 41 is engaged to the first locking notch 51, in order to avoid the instability that the fixing protrusion 20 goes further into the fixing recess 30 and cause the armrest 10 to move up and down, there is a step portion 60 at the connection between the lower part of the armrest 10 and the fixing protrusion 20, as shown in FIG. 3-FIG. 5, the step portion 60 is used to prevent the fixing protrusion 20 from going further into the fixing recess 30 after being installed in position.

By using the fixing device for the armrest of the car seat according to the present disclosure, the user can assemble the armrest 10 by himself. The installation can be completed only by aligning the fixing protrusion 20 of the armrest 10 with the fixing recess 30, then pressing the armrest 10 downward, inserting the fixing protrusion 20 into the fixing recess 30 until the first locking projection 41 engages to the first locking notch 51, and the step portion 60 butts against the upper edge of the fixing recess 30. The whole installation process does not need any other tools. Moreover, after installation, the fixing device provides sufficient connection strength between the armrest and the car seat, and improves the comfort of the armrest.

Figure 9:
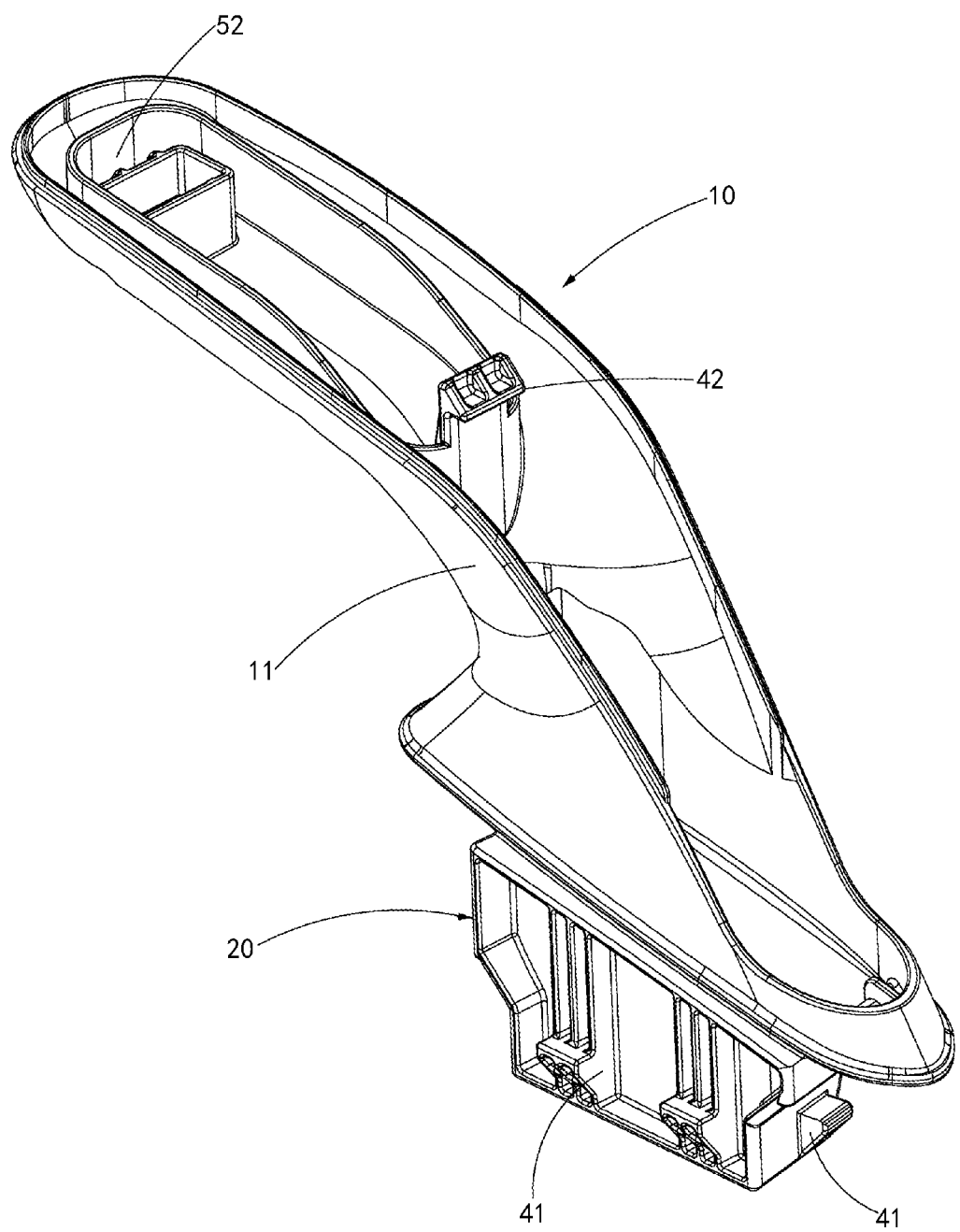
FIG. 9 is a schematic diagram of the fixing device and the armrest without armrest upper cover according to another embodiment of the present disclosure.
Figure 11:
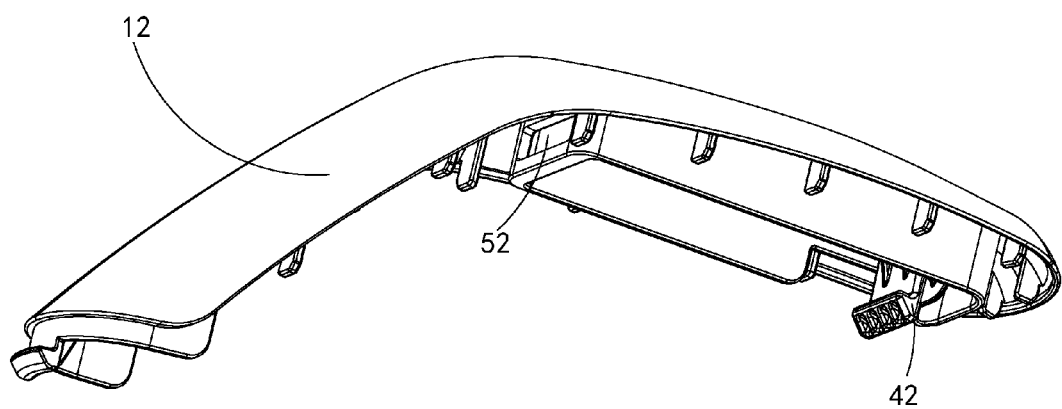
FIG. 11 is a schematic diagram of the armrest upper cover.

As shown in FIG. 1, the armrest 10 may include an armrest body 11 and an armrest upper cover 12 covering the armrest body 11. In order to facilitate the connection between the armrest body 11 and the armrest upper cover 12, a fixing manner similar to the fixing manner between the fixing protrusion 20 and the fixing recess 30 can be adopted. Specifically, as shown in FIGS. 9 to 11, the armrest body 11 can be provided with a second locking projection 42 with a positive cone shape, the position of the armrest upper cover 12 corresponding to the second locking projection 42 is provided with a second locking notch 52, and the second locking projection 42 can be engaged to the second locking notch 52, so that the armrest upper cover 12 can be fixed to the armrest body 11.

Alternatively, the armrest body 11 may also be provided with the second locking notch 52, the position of the armrest upper cover 12 corresponding to the second locking notch 52 is provided with the second locking projection 42 with an inverted cone shape, and the second locking projection 42 can be engaged to the second locking notch 52, so that the armrest upper cover 12 can be fixed to the armrest body 11.

Further, the armrest body 11 can be provided with the second locking projection 42 and the second locking notch 52 at the same time, and the corresponding second locking notch 52 and second locking projection 42 can be provided at the corresponding positions of the armrest upper cover 12 at the same time.

Figure 12:
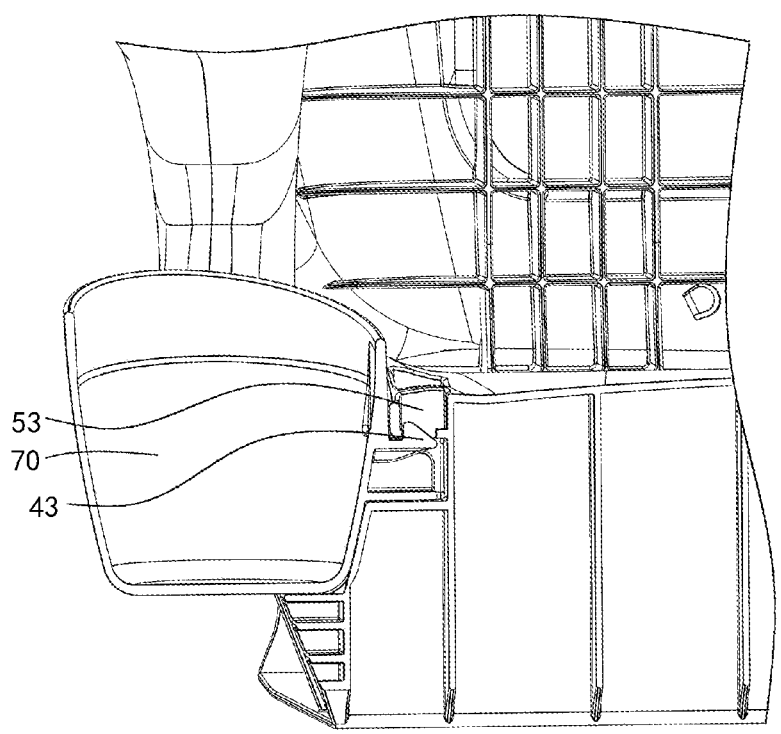
FIG. 12 is a sectional view of the connection between the shelf and the car seat.
Figure 13:
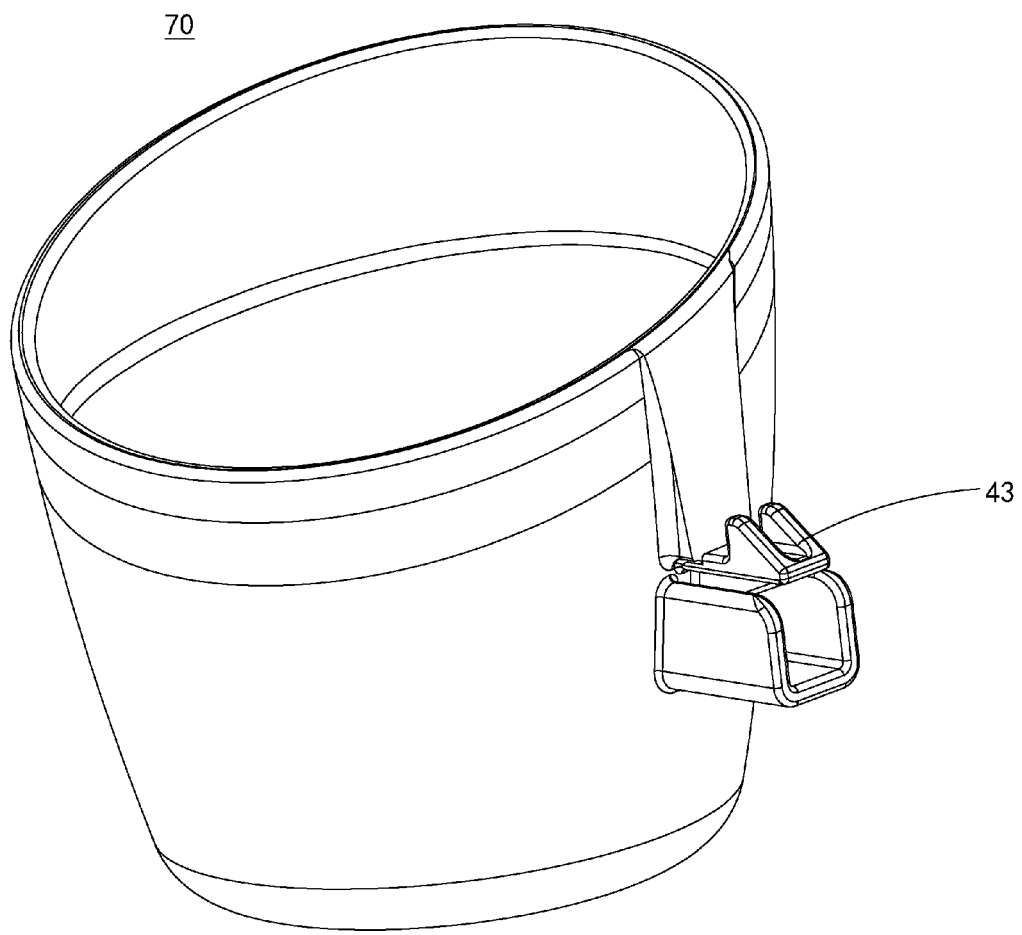
FIG. 13 is a schematic diagram of the shelf.

In order to increase the convenience of use, the car seat can also be provided with a shelf 70 for placing water cups, toys, mobile phones and other handy items. The connection between the shelf 70 and the car seat can also adopt a fixing manner similar to the fixing manner between the fixing protrusion 20 and the fixing recess 30. Specifically, as shown in FIG. 8, FIG. 12 and FIG. 13, the shelf 70 is provided with a third locking projection 43 with a positive cone shape, the cushion of the car seat is provided with a third locking notch 53, and the third locking projection 43 can be engaged to the third locking notch 53, so that the shelf 70 can be fixed to the cushion of the car seat.

It should be noted that the first locking projection 41, the second locking projection 42 and the third locking projection 43 can be components with exactly the same structure. Similarly, the first locking notch 51, the second locking notch 52 and the third locking notch 53 can also be components with exactly the same structure. The "first", "second" and "third" are just to distinguish them for different connecting parts.

The fixing device for the armrest of the car seat according to the present disclosure provides sufficient connection strength between the armrest and the car seat. Moreover, the fixing device enables users to assemble the armrest by themselves, which is also very convenient. The armrest can be directly inserted and engaged without any other tools, which also reduces the packaging volume of car seats when they are shipped. In addition, the armrest, shelf and other accessories of the car seat are fixed to the car seat by means of the engaging between the locking projection and the locking notch, which not only saves the cost, but also is convenient to assemble.

In the above description of representative examples, direction terms (such as "up", "down", etc.) are used for ease of reference to the accompanying drawings. However, it should be clearly understood that the scope of the present disclosure is not limited to any particular direction described herein.

The exemplary embodiments of the present disclosure appearing in the application of the disclosure shall not be construed as limiting the application of the appended claims. The verb "include" is used as an open qualification in the application of the present disclosure, which does not exclude the existence of unlisted features. Unless otherwise specified, the features recorded in the dependent claims can be freely combined with each other. Novel features regarded as features of the present disclosure are particularly set forth in the appended claims.

The foregoing embodiments and advantages are only exemplary and cannot be regarded as limitations to the present disclosure. The description herein is intended to be an example and not to limit the protection scope of the claims. A variety of alternatives, modifications and amendments are obvious to the person skilled in the art. The features, structures, methods, and other features of the exemplary embodiments described herein may be combined in a variety of ways to obtain other and/or alternative exemplary embodiments.

Since the features of the present disclosure can be embodied in various forms without departing from the features of the present disclosure, it should further be understood that the above embodiments are not limited to any details described above, unless otherwise noted, but should be broadly interpreted as being within the scope defined by the appended claims. Therefore, all modifications and amendments falling within the scope and limits of the claims or the equivalent solutions of such scope and limits shall be covered by the appended claims.

What is claimed is:

1. A fixing device for an armrest of a car seat, comprising:
a fixing protrusion connected to a lower part of the armrest; and
a fixing recess arranged on each side of a cushion of the car seat, wherein the fixing recess is close to a seat back of the car seat, the fixing protrusion can be inserted into the fixing recess;
wherein the fixing protrusion is a hollow tubular structure, an inner side surface of the hollow tubular structure is provided with a first locking projection with an inverted cone shape, and an interior of the fixing recess is provided with a cylindrical structure capable of inserting into the hollow tubular structure, a position of a side wall of the cylindrical structure corresponding to the first locking projection on the inner side surface of the hollow tubular structure is provided with a first locking notch; and
wherein the first locking projection can be engaged to the first locking notch, so that the fixing protrusion can be fixed into the fixing recess.

2. The fixing device according to claim 1, wherein an outer side surface of the fixing protrusion is provided with the first locking projection with an inverted cone shape, and a position of a side wall of the fixing recess corresponding to the first locking projection is provided with the first locking notch.

3. The fixing device according to claim 2, wherein the outer side surface of the fixing protrusion is further provided with the first locking notch, and a position of the side wall of the fixing recess corresponding to the first locking notch on the outer side surface is provided with the first locking projection with a positive cone shape.

4. The fixing device according to claim 1, wherein a side wall of the fixing protrusion is provided with the first locking notch, and a position of an inner side surface of the fixing recess corresponding to the first locking notch is provided with the first locking projection with a positive cone shape.

5. The fixing device according to claim 1, wherein the connection between the lower part of the armrest and the fixing protrusion has a step portion.

6. The fixing device according to claim 1, wherein the armrest comprises an armrest body and an armrest upper cover covering the armrest body.

7. The fixing device according to claim 6, wherein the armrest body is provided with a second locking projection with a positive cone shape, a position of the armrest upper cover corresponding to the second locking projection is provided with a second locking notch, and the second locking projection can be engaged to the second locking notch, so that the armrest upper cover can be fixed to the armrest body.

8. The fixing device according to claim 6, wherein the armrest body is provided with a second locking notch, a position of the armrest upper cover corresponding to the second locking notch is provided with a second locking projection with an inverted cone shape, and the second locking projection can be engaged to the second locking notch, so that the armrest upper cover can be fixed to the armrest body.

9. A car seat, comprising:
an armrest comprising:
an armrest body and an armrest upper cover covering the armrest body;
the armrest body includes an armrest body locking projection with a Positive cone shape and an armrest body locking notch; and
the armrest upper cover includes an armrest upper cover locking projection with a positive cone shape and an armrest upper cover locking notch;
wherein the armrest body locking projection can be engaged to the armrest upper cover locking notch, and the armrest body locking notch can be engaged to the armrest upper cover locking projection, so that the armrest upper cover can be fixed to the armrest body; and
a fixing device for the armrest, the fixing device comprising:
a fixing protrusion connected to a lower part of the armrest; and
a fixing recess arranged on each side of a cushion of the car seat, wherein the fixing recess is close to a seat back of the car seat, the fixing protrusion can be inserted into the fixing recess;
one of the fixing protrusion and the fixing recess is provided with a first locking projection, and the other of the fixing protrusion and the fixing recess is provided with a first locking notch, the first locking projection can be engaged to the first locking notch, so that the fixing protrusion can be fixed into the fixing recess.

10. The car seat according to claim 9, wherein the car seat is further provided with a shelf, the shelf is provided with a third locking projection with a positive cone shape, the cushion of the car seat is provided with a third locking notch, and the third locking projection can be engaged to the third locking notch, so that the shelf can be fixed to the cushion of the car seat.

11. The car seat according to claim 9, wherein a position of the armrest upper cover corresponding to the armrest body locking projection is provided with the armrest upper cover locking notch, and the armrest body locking projection can be engaged to the armrest upper cover locking notch, so that the armrest upper cover can be fixed to the armrest body.

12. The car seat according to claim 9, wherein a position of the armrest body corresponding to the armrest upper cover locking projection is provided with the armrest body locking notch, and the armrest upper cover locking projection can be engaged to the armrest body locking notch, so that the armrest upper cover can be fixed to the armrest body.

13. The car seat according to claim 9, wherein the fixing protrusion is a hollow tubular structure, an inner side surface of the hollow tubular structure is provided with the first locking projection with an inverted cone shape, and an interior of the fixing recess is provided with a cylindrical structure capable of inserting into the hollow tubular structure, a position of a side wall of the cylindrical structure corresponding to the first locking projection on the inner side surface of the hollow tubular structure is provided with the first locking notch.

14. The car seat according to claim 9, wherein the fixing protrusion is a hollow tubular structure, an inner side wall of the hollow tubular structure is provided with the first locking notch, and an interior of the fixing recess is provided with a cylindrical structure capable of inserting into the hollow tubular structure, a position of an outer side surface of the cylindrical structure corresponding to the first locking notch on the inner side wall of the hollow tubular structure is provided with the first locking projection with a positive cone shape.

15. The fixing device according to claim 1, wherein armrest comprise:
    an armrest body and an armrest upper cover covering the armrest body;
    the armrest body includes an armrest body locking projection with a positive cone shape and an armrest body locking notch; and
    the armrest upper cover includes an armrest upper cover locking projection with a positive cone shape and an armrest upper cover locking notch;
    wherein the armrest body locking projection can be engaged to the armrest upper cover locking notch, and the armrest body locking notch can be engaged to the armrest upper cover locking projection, so that the armrest upper cover can be fixed to the armrest body.

16. A fixing device for an armrest of a car seat, comprising
    a fixing protrusion connected to a lower part of the armrest; and
    a fixing recess arranged on each side of a cushion of the car seat, wherein the fixing recess is close to a seat back of the car seat, the fixing protrusion can be inserted into the fixing recess;
    wherein the fixing protrusion is a hollow tubular structure, an inner side wall of the hollow tubular structure is provided with a first locking notch, and an interior of the fixing recess is provided with a cylindrical structure capable of inserting into the hollow tubular structure, a position of an outer side surface of the cylindrical structure corresponding to the first locking notch on the inner side wall of the hollow tubular structure is provided with a first locking projection with a positive cone shape; and
    wherein the first locking projection can be engaged to the first locking notch, so that the fixing protrusion can be fixed into the fixing recess.

17. The fixing device according to claim 16, wherein armrest comprise:
    an armrest body and an armrest upper cover covering the armrest body;
    the armrest body includes an armrest body locking projection with a positive cone shape and an armrest body locking notch; and
    the armrest upper cover includes an armrest upper cover locking projection with a positive cone shape and an armrest upper cover locking notch;
    wherein the armrest body locking projection can be engaged to the armrest upper cover locking notch, and the armrest body locking notch can be engaged to the armrest upper cover locking projection, so that the armrest upper cover can be fixed to the armrest body.

* * * * *